UNITED STATES PATENT OFFICE.

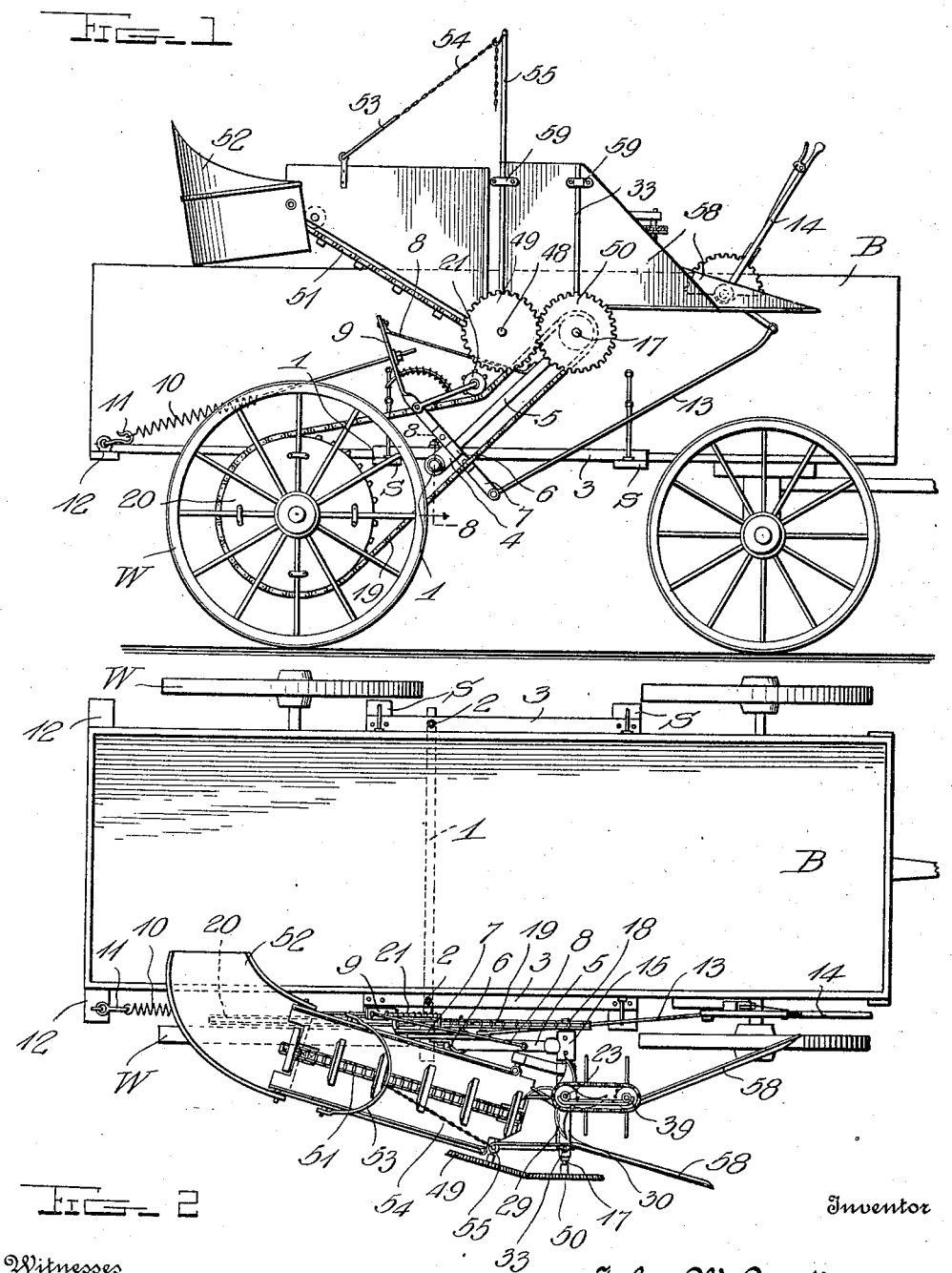

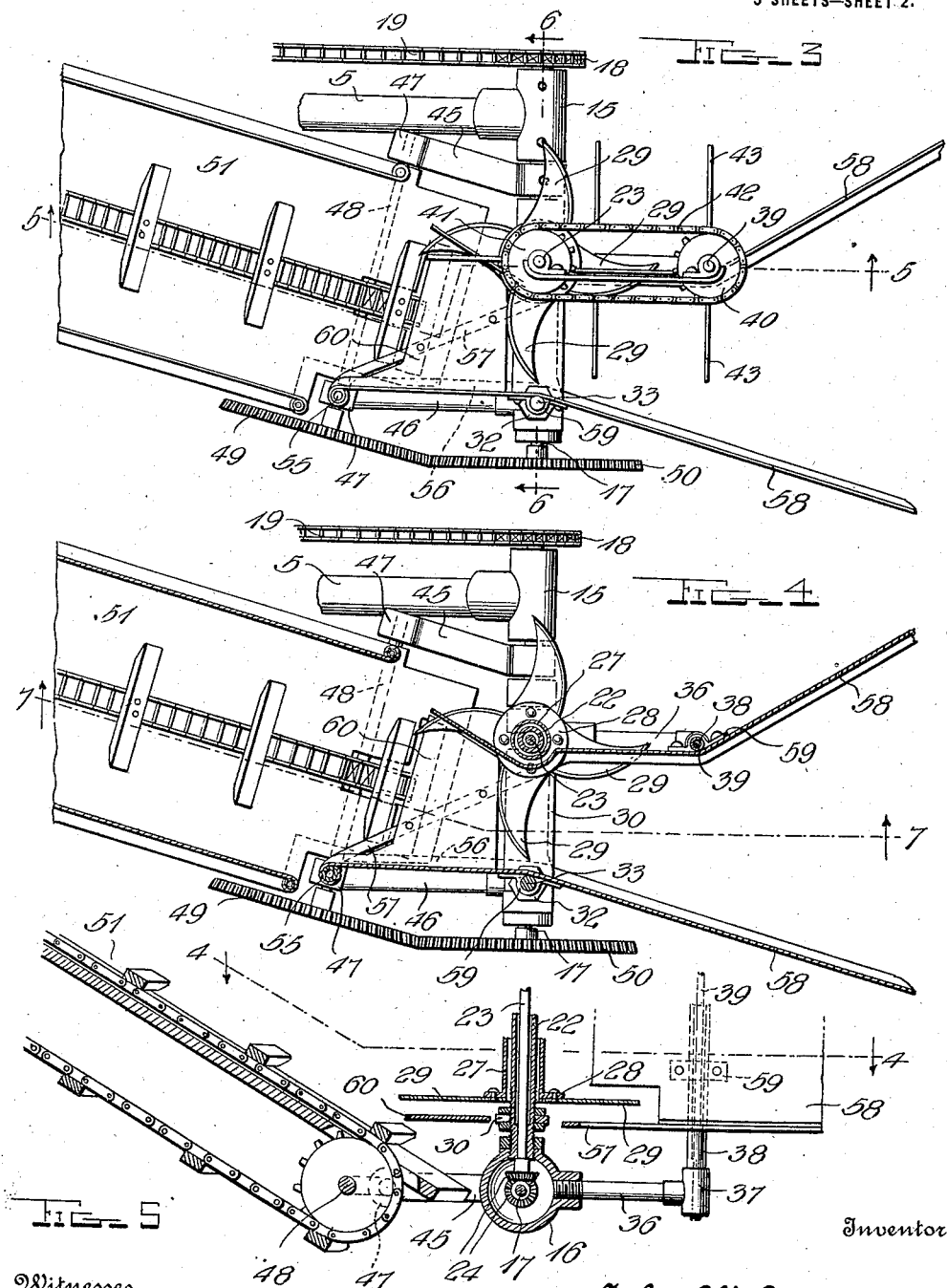

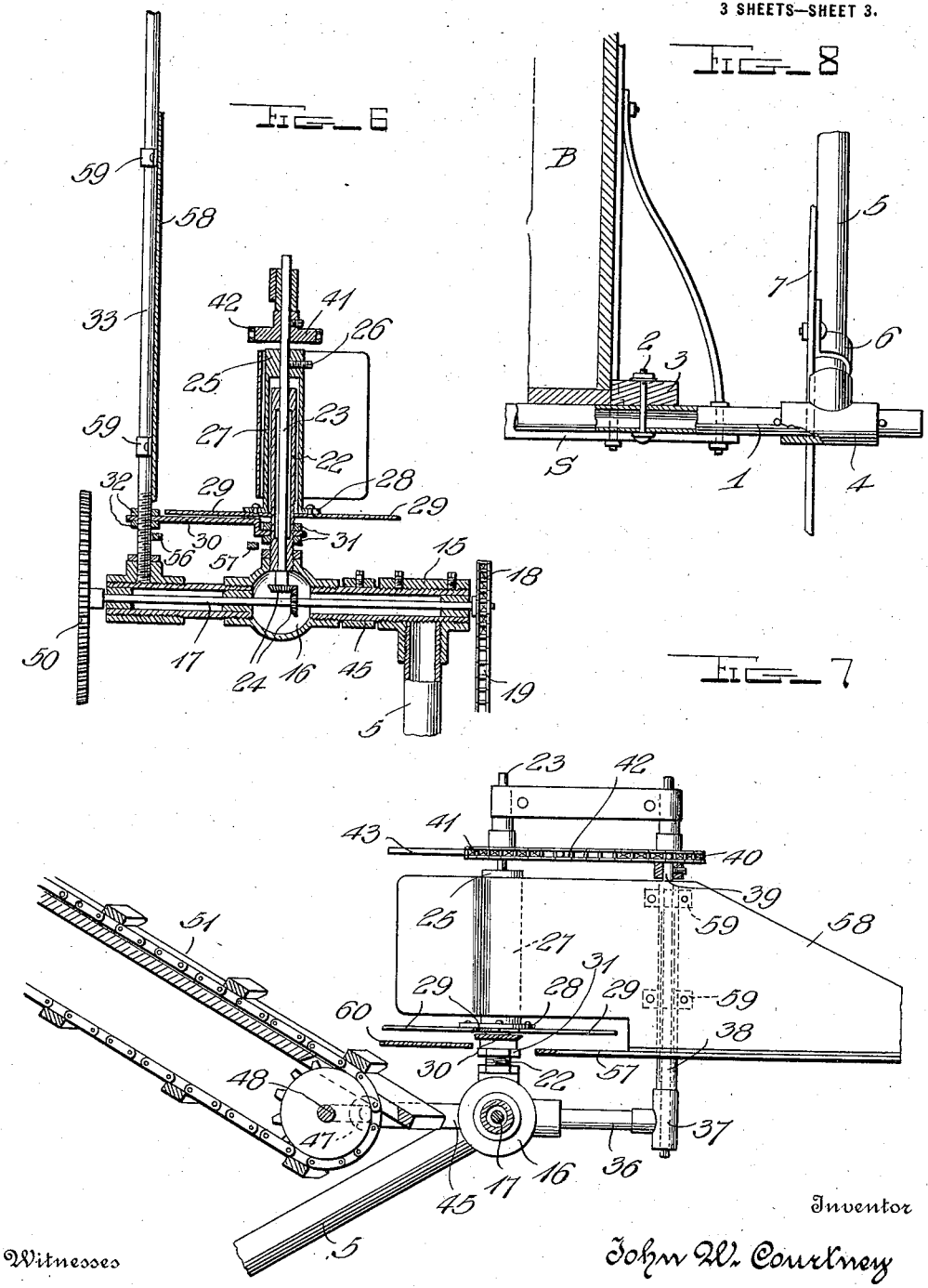

JOHN W. COURTNEY, OF ENID, OKLAHOMA.

CORN-TOPPER.

1,178,782.  Specification of Letters Patent.  Patented Apr. 11, 1916.

Application filed June 21, 1915. Serial No. 35,368.

*To all whom it may concern:*

Be it known that I, JOHN W. COURTNEY, a citizen of the United States, residing at Enid, in the county of Garfield and State of Oklahoma, have invented certain new and useful Improvements in Corn-Toppers; and I do declare the following to be a full, clear, and exact description of the invention, such as will enable others skilled in the art to which it appertains to make and use the same.

This invention relates to harvesters, and more especially to those adapted for cutting the tops off of Kafir corn and the like; and the object of the same is to produce a portable machine of this character which may be attached to the box or body of an ordinary farm wagon and driven by a sprocket chain led from a driving sprocket secured to the hub of one of the rear wheels.

The invention consists in the specific details of construction hereinafter more fully described and claimed, and as shown in the drawings wherein—

Figure 1 is a side elevation of this machine complete, and Fig. 2 is a plan view thereof; Fig. 3 is a plan view of the forward portion of the topping mechanism on an enlarged scale, and Fig. 4 is a horizontal section on about the line 4—4 of Fig. 5, Fig. 5 being a vertical section on the line 5—5 of Fig. 3; Fig. 6 is a cross section on the line 6—6 of Fig. 3; Fig. 7 is a longitudinal vertical section on the line 7—7 of Fig. 4; Fig. 8 is an enlarged cross section on the line 8—8 of Fig. 1.

The machine forming the subject matter of this invention is intended to be made and sold as an attachment capable of application to an ordinary farm wagon and used to harvest the heads of Kafir corn, milo maize, cane, and any and all crops of that kind which are grown very extensively in the States of Kansas, Nebraska, Oklahoma, Colorado, New Mexico, Arizona and California. When so applied to the wagon, the body B of the latter becomes a receptacle into which the heads are delivered and one of the rear wheels W becomes a part of the driving mechanism because it is made to carry a large sprocket or bull-wheel which is connected with the main shaft in the manner yet to be described. The wagon is drawn by a team of horses, guided by the single operator who sits or stands adjacent the control lever which latter with its support is mounted on the body or could in fact be the usual brake-lever already found on such wagons if the user removes the brakes and the connections between them and such lever. With the object of producing an attachment of this character which is inexpensive and yet reliable, and capable of quick attachment to any of the well known forms of ordinary wagons, I have reduced its parts to those only which are absolutely necessary to cut the heads off of tall corn or the like, and these parts I make as far as possible of gas pipe, sheet iron, straps and rods, and gears and bolts of standard size which may readily be obtained on the market, leaving the manufacturer with as few special forms or castings required as is possible and also enabling the user to replace broken or defective parts with ease. The knives or the cutting edges of the knives hereinafter referred to will be tempered, but otherwise ordinary iron may be used throughout, and the finish as well as the proportions of parts is not essential to the invention.

Coming now to the details, a two inch gas pipe is passed beneath the wagon body B just forward of the rearmost step-sill S with one end projecting beyond the side of the wagon body to constitute a support 1, and a bolt 2 is passed upward through this pipe and through a piece of timber 3 which lies on the two step-sills, so that by tightening up the nut on this bolt the pipe is firmly clamped to the under side of the wagon body and all strain thereon and injury thereto is avoided. By this simple expedient the attachment is fastened to the wagon, without the necessity for boring any holes in the same. Pivotally mounted on the support 1 is the head of a T-coupling 4 (which might be a pipe coupling with the threads bored out), and this coupling carries another pipe 5 which passes upward alongside the wagon body toward the control lever and forms part of the main frame which carries the attachment. Secured across the pipe 5 near its lower end by means of a clamp 6 is a bar 7 standing at about right angles to said pipe and braced therefrom as shown at 8, and the rear and upper end of this bar has a perforated ear 9 from which leads a spring 10 downward and rearward past the rear wheel W to a hook 11 suitably connected to the rear end of the wagon body as by being attached to the protruding end of the rear cross bar 12. From the lower and forward end of the bar 7 a link 13 leads upward and forward and is connected with a control lever 14 whose details of construction are too well known to need detailed description. By setting this lever the angle of the pipe 5 and therefore the position of the entire frame is adjusted, and the purpose of the spring is to assist in sustaining the weight of the mechanism carried at the upper and forward end of said pipe.

Secured to the upper end of the pipe 5 is a T-coupling 15 whose head stands horizontal, and to the outer end of this head is connected a housing 16 made up of a number of pipe sections and couplings as shown, although of course all of this member might be made in one casting. The housing incloses and forms a bearing for the main shaft 17 which has a sprocket 18 on its inner end connected by a chain belt 19 with a sprocket or bull wheel 20 secured inside the rear wheel W as suggested above, the upper stretch of this belt preferably passing under a belt tightener 21 which may be carried by the main frame and whose detailed construction is not important. Carried by and rising from said housing near the T-coupling 15 is a tubular standard 22 which also may well be a piece of gas pipe, and this standard contains bearings for an upright shaft 23 whose lower end is connected by bevel gears 24 with the main shaft 17 as best seen in Fig. 6 and whose upper end projects above the standard 22 as shown. On this upper end is secured the upper end 25 of a sleeve 27, rendered adjustable in any suitable way as by a set screw 26, said sleeve being larger than and inclosing the standard 22. At the lower end of the tube is a hub 28 at the center of a rotary knife 29 whose arms, four in number as shown, are sharpened on their forward edges and revolve around this standard in a horizontal plane slightly above the housing 16. Immediately beneath this rotary knife is mounted a fixed knife 30, its inner end being by preference clamped between two nuts 31 which are adjustable on the standard 22, and its outer end being clamped between two similar nuts 32 on an upright rod 33 which rises from the outer end of the housing 16 and will be referred to hereinafter. By moving these nuts upward or downward the position of the fixed knife may be adjusted so that its cutting edge stands very close below the cutting edges of the rotary knife. When these knives become dull they may be removed—the fixed knife by loosening the pairs of nuts at its extremities and removing the blade bodily, and the rotary knife by removing the set screw 26 and lifting the entire knife and its support 25, 27, and 28 off the standard 22.

Projecting forward from the housing 16 is a rod or tube 36 having a T-coupling 37 at its outer end, and in the same is supported an upright tube 38 forming a bearing for an upright shaft 39 whose upper end carries a sprocket wheel 40 as shown. A similar sprocket wheel 41 is removably mounted on the upper end of the shaft 23 and these two wheels are connected by an endless chain 42 carrying radial fingers 43. This entire device I call a header or reel, and its function is to press the heads to the rear toward the knives which constitute the cutting apparatus.

Projecting to the rear from the housing 16 are rods or tubes 45, 46, having bearings 47 at their rear ends for a shaft 48 which stands slightly out of alinement with the main shaft and oblique to the line of draft and carries a gear wheel 49 on its outer end meshing with another gear 50 at the outer end of the main shaft 17 and by means of which motion is communicated thereto. I may say that this shaft 48 is the forward shaft of an elevator or conveyer mechanism whose details are not necessary to amplify and which may be indicated by the reference numeral 51, its purpose being to convey the heads cut by the cutting apparatus rearward and upward to a trough or chute 52, which in turn conveys them inward over the side of the wagon body B and drops them into the latter. The sides of the elevator may be of sheet metal, and they are connected at their upper edges by a bail 53 from which a wire or chain 54 leads to the upper end of a post 55 rising from the rear end of the supporting rod or tube 46, and by adjusting the length of this chain the angle of the elevator 51 to the horizontal may be changed at will. The trough will by preference be hingedly connected with the rear end of the elevator, and at its inner extremity it rests on the side of the wagon body so that this trough will automatically assume the proper inclination as the elevator is adjusted. In fact, when the housing 16 is depressed by the control lever (as sometimes necessary when the driver finds that he is approaching a spot where the corn is short) the pivotal mounting of the shaft 48 within the bearings 47 permits the entire elevator to accommodate itself to the lower cutting mechanisms without necessarily adjusting the length of the chain 54. Rods or bars 56 and 57 lead from said post 55 over the housing 16, and then diverge forward from the cutting apparatus and constitute guides for directing the heads of the corn to said apparatus. In rear of the latter a plate 60 overlies said rods or bars and the forward end of the elevator. Upright side plates 58 are supported at their lower edges by said rods or bars and are connected by clips 59 or otherwise with the rod 33 and the tube 38, and these side plates may be of sheet metal, canvas, or any suitable material, or possibly of light screening if desired.

With the above construction of parts, the operation is as follows: The attachment being connected with an ordinary farm wagon in the manner first above described, and the horses hitched thereto and the entire machine driven to the point of use, the operator manipulates the control lever 14 to drop the line of the cutting apparatus to a point where it will sever the heads from the standing corn as is necessary to harvest the same. Driving alongside a row of corn, the guide fingers 56 and 57 direct the stalks to the cutting apparatus, and the rapidly revolving knife 29 moving over the fixed knife 30 cuts said stalks just beneath the heads, the reel fingers 43 meanwhile knocking the heads over to the rear so that they fall backward onto the plate 60 and elevator 51. By the latter they are raised and delivered into the trough 52 and from this trough they fall into the wagon body B. When now the operator finds that he is approaching a point where the corn is tall, he manipulates the hand lever 14 so as to raise the housing 16 by swinging the same on its support around the stub shaft 1. This brings the line of the cut to a higher point, and of course renders the elevator 51 less steep, and any looseness in the drive chain 19 is taken up by the belt tightener 21. Having passed this point he drops the line of cut to the position where it was before; and if he approaches a point where the corn is rather short, a reversal of the operation depresses the line of cut as will be clearly understood. In the cheaper machines it is possible to unship the chain belt 19 from the bull-wheel 20 in driving the wagon to and from the scene of action, and thereby check the movements of parts at this time; but in a higher type of the machine a clutch mechanism might be interposed, although no novelty is claimed for the same and its details need not be amplified. Other refinements and accessories may be added to the attachment to meet the demands of those who desire them; but with the object of making it as cheap as possible I would omit all unnecessary details unless they are called for, and thereby put the attachment within the reach of all.

What is claimed as new is:

1. In a corn topper attachment for farm wagons, the combination with a stub shaft adapted to be secured to the wagon body and to project from one side thereof, and a control lever; of a bearing mounted on said stub shaft, a frame member inclining upward and forward from said bearing, a bar secured across the lower end of said frame member, a spring for connecting one end of said bar with the wagon body, means connecting the other end of said bar with said control lever, a cutting apparatus carried on the frame member, and means for driving said apparatus.

2. In a corn topper, the combination with a frame member adapted to be pivotally supported alongside a wagon body, and means for adjusting the angle of said member; of a horizontally disposed tubular housing carried by the upper end of the frame member and projecting at an angle thereto, a main shaft rotatably mounted in said housing and having a driving wheel at one end, means for driving said wheel, a tubular standard rising from the housing, a rotary knife whose shaft is journaled in said standard, bevel gears connecting said shaft with the main shaft, and means for conveying the severed heads from said rotary knife to the wagon body.

3. In a corn topper, the combination with a frame member adapted to be pivotally supported alongside a wagon body, and means for adjusting the angle of said frame member; of a horizontally disposed housing carried by the upper end of said frame member and projecting at an angle thereto, a main shaft rotatably mounted in said housing and having a driving wheel at one end, means for driving said wheel, a tubular standard rising from said housing, a cutter shaft rotatably mounted in said standard, gears connecting the lower end of said cutter shaft with said main shaft, a feeder driven from the upper end of the cutter shaft, a sleeve secured to said shaft above the standard and depending around said standard, a rotary knife carried by the sleeve, a fixed knife carried by said standard below the rotary knife and coacting with the latter, and means for conveying the severed heads into the wagon body.

4. In a corn topper, the combination with a frame member adapted to be adjustably supported alongside a wagon body, of a housing carried by and projecting at right angles to the frame, a main shaft rotatably mounted in said housing and having a driving wheel, means for driving said wheel, a tubular standard rising from said housing, a cutter shaft rotatably mounted in said housing, driving connections between this shaft and said main shaft, a feeder driven from the upper end of said cutter shaft, a sleeve secured to this shaft above the standard and depending around said standard, a rotary cutter carried by the sleeve, a pair of nuts on the standard below the rotary cutter, a rod rising from the housing, a pair of nuts on this rod, a fixed knife having its extremities clamped between said pairs of nuts, and means for conveying the severed heads into the wagon body.

5. In a corn topper attachment, the combination with a frame member, a horizontally projecting housing carried thereby, arms projecting to the rear from said housing and having bearings, an elevator carried by said bearings, a main shaft journaled in said housing and having a gear wheel at its outer end, a gear on the forward shaft of the elevator meshing therewith, and means for rotating said main shaft; of a beveled gear on said main shaft within said housing, a tubular standard rising from said housing, an upright shaft journaled in the standard and having a beveled gear meshing with that on the main shaft, a rotary cutting knife removably mounted on said upright shaft, a feeder carried by the upper end of this shaft, a pair of nuts on said standard beneath the rotary knife, a rod rising from the outer end of said housing, a pair of nuts on this rod, and a stationary knife whose ends are removably clamped between said pairs of nuts, for the purpose set forth.

6. In a corn topping attachment for farm wagons, the combination with a support for connection to the wagon body and carrying a housing, a control lever, and connections between it and said support for adjusting the angle of the latter; of a cutting apparatus carried by said housing, driving means for said apparatus, arms projecting to the rear from said housing and having bearings, an elevator whose forward shaft is rotatably mounted in said bearings and whose sides are connected by a bail, an upright post rising from one of said arms, a chain connecting said post and bail for limiting the descent of the rear end of the elevator, and a trough hingedly connected with the rear end of the elevator, and adapted to lie across the side of the wagon body.

7. In a corn topper, the combination with a frame member adapted to be adjustably supported alongside a wagon body, a housing carried by the upper end of the frame, a main shaft rotatably mounted in said housing, and means for driving said shaft; of a tubular standard rising from said housing, a shaft rotatably mounted therein, means for driving it from said main shaft, a feeder driven from the upper end of the upright shaft, a sleeve secured to said shaft above the standard and depending around said standard, a hub carried by said sleeve, a rotary knife carried by the hub, a fixed knife below the rotary knife, and means for conveying the severed heads into the wagon body.

In testimony whereof I have hereunto set my hand in presence of two subscribing witnesses.

JOHN W. COURTNEY.

Witnesses:
  FREEL FROMHOLZ,
  E .J. FREEMAN.

Copies of this patent may be obtained for five cents each, by addressing the "Commissioner of Patents, Washington, D. C."